(12) United States Patent
Kuiper et al.

(10) Patent No.: US 11,203,604 B2
(45) Date of Patent: Dec. 21, 2021

(54) PREPARATION OF TRIIODOSILANES

(71) Applicant: ENTEGRIS, INC., Billerica, MA (US)

(72) Inventors: David Kuiper, Brookfield, CT (US); Manish Khandelwal, Danbury, CT (US); Thomas M. Cameron, Newtown, CT (US); Thomas H. Baum, New Fairfield, CT (US); John Cleary, Monroe, CT (US)

(73) Assignee: Entegris, Inc., Billerica, MA (US)

( * ) Notice: Subject to any disclaimer, the term of this patent is extended or adjusted under 35 U.S.C. 154(b) by 108 days.

(21) Appl. No.: 16/706,347

(22) Filed: Dec. 6, 2019

(65) Prior Publication Data

US 2020/0181178 A1    Jun. 11, 2020

Related U.S. Application Data

(60) Provisional application No. 62/777,460, filed on Dec. 10, 2018.

(51) Int. Cl.
*C07F 7/08* (2006.01)

(52) U.S. Cl.
CPC .................. *C07F 7/0827* (2013.01)

(58) Field of Classification Search
CPC ......... C07F 7/0827; C07F 7/122; C07F 7/123
See application file for complete search history.

(56) References Cited

U.S. PATENT DOCUMENTS

| | | | |
|---|---|---|---|
| 8,765,090 B2 | 7/2014 | Katsoulis | |
| 9,564,309 B2 | 2/2017 | Niskanen | |
| 9,745,200 B2 | 8/2017 | Wieber | |
| 10,384,944 B2 * | 8/2019 | Ritter | .................... C23C 16/448 |
| 2012/0114544 A1 * | 5/2012 | Jung | ........................ C07F 7/12 |
| | | | 423/342 |
| 2015/0147824 A1 | 5/2015 | Cameron | |
| 2016/0264426 A1 | 9/2016 | Kerrigan | |
| 2017/0201426 A1 | 7/2017 | Mcquaide, Jr. | |
| 2018/0099872 A1 | 4/2018 | Ritter | |

FOREIGN PATENT DOCUMENTS

| | | |
|---|---|---|
| WO | 2012033644 W | 3/2012 |
| WO | 2017201456 A1 | 11/2017 |
| WO | 2018186882 A1 | 10/2018 |

OTHER PUBLICATIONS

Eaborn, C., "Organosilicon Compounds. Part I. The Formation of Alkyliodosilanes", J. Chem. Soc., 1949, pp. 2755-2764, abstract.
Kim, B.-K. et al., "Synthesis and Characterization of New Cationic Hexacoordinate Silanes", Inorg. Chem., 2000, vol. 39, pp. 728-731, abstract; scheme 1.
Fester, G. et al., "Reactions of Hydridochlorosilanes with 2,2'-Bipyridine and 1,1—Phenanthroline: Complexation versus Dismutation and Metal-Catalyst-Free, 1,4-Hydrosilylation"; Inorganic Chemistry, 2010, 49, 2667-2673.
Maddock, A.G. et al.; "New Iodine and Fluorine Derivatives of Monosilane"; Nature, 1939, 144, pp. 328.
Tamizhmani, G., et al.; "Some Physical Properties of Undoped Amorphous Silicon Prepared by a New Chemical Vapor Deposition Process Using Iodosilanes"; Chemical Materials, 1990, 2, 473-476.
Wolf, E. et al.; "Preparation of di- and triiodosilanes"; Z. Chen, 2, Jg., Heft5, pp. 154-155; 1962 (English Abstract Only).

\* cited by examiner

*Primary Examiner* — Pancham Bakshi

(74) *Attorney, Agent, or Firm* — Entegris, Inc.

(57) ABSTRACT

Provided is a process for preparing certain silane precursor compounds, e.g., triiodosilane from trichlorosilane utilizing lithium iodide in powder form and catalyzed by tertiary amines. The process provides triiodosilane in high yields and high purity. Triiodosilane is a precursor compound useful in the atomic layer deposition of silicon onto various microelectronic device structures.

16 Claims, No Drawings

PREPARATION OF TRIIODOSILANES

FIELD OF THE INVENTION

This invention relates to the field of chemistry. In particular, it relates to methodology for the preparation of triiodosilanes and other silicon precursor compounds.

BACKGROUND OF THE INVENTION

Low temperature deposition of silicon-based thin-films is of fundamental importance to current semiconductor device fabrication and processes. For the last several decades, $SiO_2$ thin films have been utilized as essential structural components of integrated circuits (ICs), including microprocessor, logic and memory based devices. $SiO_2$ has been a predominant material in the semiconductor industry and has been employed as an insulating dielectric material for virtually all silicon-based devices that have been commercialized. $SiO_2$ has been used as an interconnect dielectric, a capacitor and a gate dielectric material over the years.

The conventional industry approach for depositing high-purity $SiO_2$ films has been to utilize tetraethylorthosilicate (TEOS) as a thin-film precursor for vapor deposition of such films. TEOS is a stable, liquid material that has been employed as a silicon source reagent in chemical vapor deposition (CVD), plasma-enhanced chemical vapor deposition (PECVD) and atomic layer deposition (ALD), to achieve high-purity thin-films of $SiO_2$. Other thin-film deposition methods (e.g., focused ion beam, electron beam and other energetic means for forming thin-films) can also be carried out with this silicon source reagent.

As integrated circuit device dimensions continually decrease, with corresponding advances in lithography scaling methods and shrinkage of device geometries, new deposition materials and processes are correspondingly being sought for forming high integrity $SiO_2$ thin films. Improved silicon-based precursors (and co-reactants) are desired to form $SiO_2$ films, as well as other silicon-containing thin films, e.g., $Si_3N_4$, SiC, and doped $SiO_x$ high k thin films, that can be deposited at low temperatures, such as temperatures below 400° C. and below 200° C. To achieve these low deposition temperatures, chemical precursors are required that decompose cleanly to yield the desired films.

The achievement of low temperature films also requires the use and development of deposition processes that ensure the formation of homogeneous conformal silicon-containing films. Chemical vapor deposition (CVD) and atomic layer deposition (ALD) processes are therefore being refined and implemented, concurrently with the ongoing search for reactive precursor compounds that are stable in handling, vaporization and transport to the reactor, but exhibit the ability to decompose cleanly at low temperatures to form the desired thin films. The fundamental challenge in this effort is to achieve a balance of precursor thermal stability and precursor suitability for high-purity, low temperature film growth processes.

Triiodosilane is a compound useful for the atomic layer deposition of silicon to microelectronic device substrates (See, for example, U.S. Pat. No. 9,564,309, incorporated herein by reference).

SUMMARY OF THE INVENTION

The invention is as set forth in the appended claims. Generally, the invention provides methodology for preparing certain iodosilane compounds, useful as precursors in the vapor deposition of silicon onto microelectronic device substrates. In certain embodiments, the invention provides a process for preparing triiodosilane from trichlorosilane utilizing lithium iodide in powder form and catalyzed by certain tertiary amines. The process provides triiodosilane in high yields and high purity. The highly pure triiodosilane product is useful as a precursor in the atomic layer deposition of silicon onto various microelectronic device structures and is suitable for both thermal and plasma post-treatment.

Overall, the reaction can be summed up as a ligand exchange reaction between the ionic lithium iodide and ionic intermediate (I). The intermediate (I) is an ammonium chloride species which can be seen as an actual catalytic species formed in-situ.

The experimental results show that this reaction is favored in polar aprotic solvents like DCM (Example 2, 78 h) as compared to non-polar solvents like hexanes (Example 5, 192 h). This further supports the formation of the intermediate ionic species (I) in equation 3.

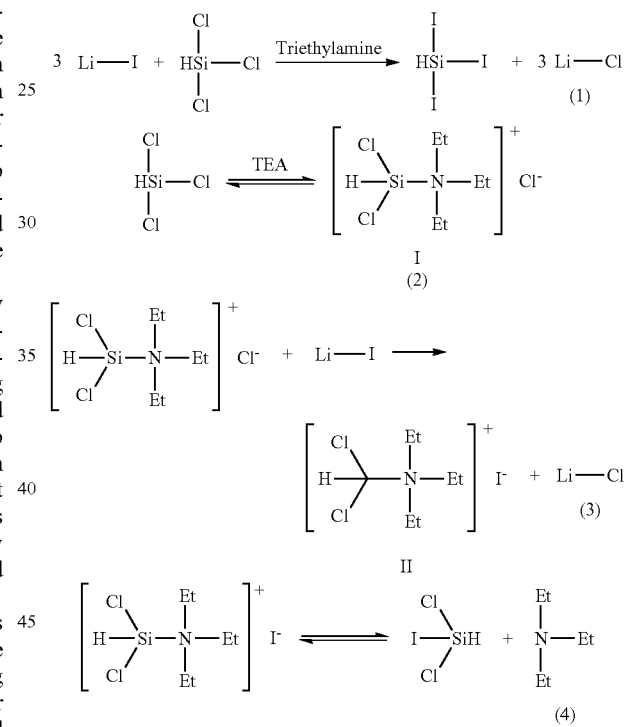

Therefore, any one skilled in the art may realize that the catalytic activity of this reaction can also be enhanced by using quaternary ammonium halides (for example $[R_4N^+ Cl^-]$ where R is an alkyl group) or quaternary phosphonium halides (for example $[R_4P^+Cl^-]$ where R is an alkyl group) or by adding a tertiary phosphine (for example ($R_3P$ where R is an alkyl group). Such catalysts have been shown to catalyze reduction of halogenated silanes into silanes by effectively exchanging halides with hydrides in an irreversible manner (Khandelwal et al, WO 2018186882).

DETAILED DESCRIPTION OF THE INVENTION

The present invention provides a process for preparing compounds of the formula $(R^1)_y Si(I)_z$, wherein each $R^1$ is independently chosen from hydrogen, $C_1$-$C_9$ alkyl, vinyl, or a $C_2$-$C_4$ alkynyl group, y is 0, 1, 2, or 3, and z is 1, 2, 3, or 4, and wherein y+z is equal to 4, which comprises contacting a compound of the formula $(R^1)_y Si(Cl)_z$ with lithium iodide in the presence of a tertiary amine, wherein the lithium iodide is in the form of a powder having an average particle size of less than about 2 mm.

In one embodiment, the compound of the formula $(R^1)_y Si(I)_z$ is triiodosilane.

In another embodiment, $R^1$ is chosen from methyl, ethyl, n-propyl, iso-propyl, n-butyl, sec-butyl, t-butyl, n-pentyl, neopentyl, vinyl, and $C_2$-$C_4$ alkynyl.

In another embodiment, the compound of the formula $(R^1)_y Si(I)_z$ is chosen from the following:
$CH_3 Si(I)_3$;
$CH_3 CH_2 Si(I)_3$;
$CH_3 CH_2 CH_2 Si(I)_3$;
$CH_3 CH_2 CH_2 CH_2 Si(I)_3$;
$(CH_3)_2 CHSi(I)_3$;
$CH_3 CH_2 (CH_3) CHSi(I)_3$;
$(CH_3)_3 CSi(I)_3$;
$CH_3 CH_2 CH_2 CH_2 Si(I)_3$;
$(CH_3)_3 CCH_2 Si(I)_3$;
$CH_2 {=} CHSi(I)_3$;
$CH{\equiv}CSi(I)_3$;
$CH{\equiv}CCH_2 Si(I)_3$;
$CH_3 C{\equiv}CSi(I)_3$;
$CH{\equiv}CCH_2 CH_2 Si(I)_3$;
$CH_3 CH{\equiv}CCH_2 Si(I)_3$;
$CH_2 CH_2 CH_2 C{\equiv}CSi(I)_3$;
$(CH_3)_2 Si(I)_2$;
$(CH_3 CH_2)_2 Si(I)_2$;
$(CH_3 CH_2 CH_2)_2 Si(1)_2$;
$(CH_3 CH_2 CH_2 CH_2)_2 Si(I)_2$;
$((CH_3)_2 CH)_2 Si(I)_2$;
$(CH_3 CH_2 (CH_3)CH)_2 Si(I)_2$;
$((CH_3)_3 C)_2 Si(I)_2$;
$(CH_3 CH_2 CH_2 CH_2)_2 Si(I)_2$;
$((CH_3)_3 CCH_2)_2 Si(I)_2$;
$(CH_2{=}CH)_2 Si(I)_2$;
$(CH{\equiv}C)_2 Si(I)_2$;
$(CH{\equiv}CCH_2)_2 Si(I)_2$;
$(CH_3 C{\equiv}C)_2 Si(I)_2$;
$(CH{\equiv}CCH_2 CH_2)_2 Si(I)_2$;
$(CH_3 CH{\equiv}CCH_2)_2 Si(I)_2$;
$(CH_2 CH_2 CH_2 C{\equiv}C)_2 Si(I)_2$;
$(CH_3)_3 SiI$;
$(CH_3 CH_2)_3 SiI$;
$(CH_3 CH_2 CH_2)_3 SiI$;
$(CH_3 CH_2 CH_2 CH_2)_3 SiI$;
$((CH_3)_2 CH)_3 SiI$;
$(CH_3 CH_2 (CH_3)CH)_3 SiI$;
$((CH_3)_3 C)_3 SiI$;
$(CH_3 CH_2 CH_2 CH_2)_3 SiI$;
$((CH_3)_3 CCH_2)_3 SiI$;
$(CH_2{=}CH)_3 SiI$;
$(CH{\equiv}C)_3 SiI$;
$(CH{\equiv}CCH_2)_3 SiI$;
$(CH_3 C{\equiv}C)_3 SiI$;
$(CH{\equiv}CCH_2 CH_2)_3 SiI$;
$(CH_3 CH{\equiv}CCH_2)_3 SiI$; and
$(CH_2 CH_2 CH_2 C{\equiv}C)_3 SiI$.

In this process, commercially available lithium iodide powder may be utilized as is or with further milling to provide a powder of lithium iodide which has, in certain embodiments, a particle size diameter of less than 1, less than 0.5, or less than 0.1 mm.

The tertiary amines may be mono-amines or polyamines. The tertiary amines can be of any structure and possess other functional groups, provided that said groups do not interfere in the displacement reaction of the invention; in this regard, such tertiary amines should not possess imine moieties. In the case of mono-amines, examples include compounds of the formula $(R^*)_3 N$, wherein each $R^*$ is independently chosen from $C_1$-$C_6$ alkyl groups. Examples include trimethylamine, triethylamine, tri-(n-propyl)amine, tri-(isopropyl)amine, tri-(n-butyl)amine, and the like. Polyamine compounds are generally alkylamines having two or more amine functional groups, separated by an alkylene linkage. In certain embodiments, the polyamine will have the following structure:

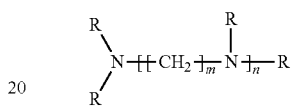

wherein each R is independently hydrogen or a $C_1$-$C_9$ alkyl group, m is an integer of from 1 to 4, and n is an integer of from 2 to 5.

In other embodiments, the tertiary amines have the formula

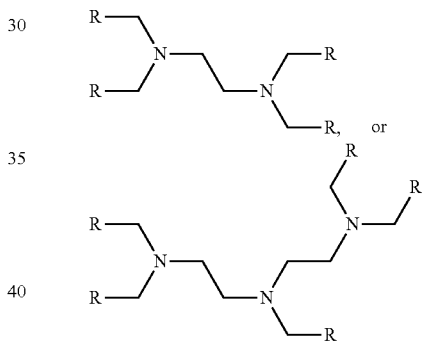

wherein each R is independently hydrogen or a $C_1$-$C_9$ alkyl group. In other embodiments, the R group is independently chosen from methyl and ethyl.

In certain embodiments, the process utilizes an aprotic non-polar solvent. Exemplary solvents include dichloromethane, chloroform, dichloroethane, carbon tetrachloride, pentane, hexane, cyclohexane, heptane, benzene, toluene, and the like.

In certain embodiments, the process is conducted at ambient pressure and at temperatures of about 20° to 40° C. or 20° to 25° C.

Upon suitable completion of the reaction, the crude product may be filtered through compatible filter media which can be composed of materials including glass, thermally activated diatomaceous earth, polypropylene, polyethylene, polytetrafluoroethylene (PTFE), perfluoroalkoxy alkanes (PFA), passivated stainless steel and nickel alloys thereof. The solvent separation from the filtrate can be accomplished by bulb-to-bulb distillation at a pressure ranging from 0.01 to 760 Torr and a temperature ranging from 20° C. to 110° C. Additional purification steps may include a short path vacuum distillation to separate the desired halosilane product from the mixed chloroiodosilane side products, the residual catalyst, and any catalyst-halosilane complexes formed in the course of the reaction, with the product purity from a short path distillation ranging from 95%-99%. Additional purification steps include the use of a fractional distillation under atmospheric pressure or vacuum conditions to achieve purities in excess of 99%.

For ease of reference, "microelectronic device" includes semiconductor substrates, flat panel displays, phase change memory devices, solar panels, logic, DRAM, and 3D NAND devices, and other products including solar substrates, photovoltaics, and microelectromechanical systems (MEMS), manufactured for use in microelectronic, integrated circuit, or computer chip applications. Solar substrates include, but are not limited to, silicon, amorphous silicon, polycrystalline silicon, monocrystalline silicon, CdTe, copper indium selenide, copper indium sulfide, and gallium arsenide on gallium. The solar substrates may be doped or undoped. It is to be understood that the term "microelectronic device" is not meant to be limiting in any way and includes any substrate that will eventually become a microelectronic device or microelectronic assembly.

The invention has been described in detail with particular reference to certain embodiments thereof, but it will be understood that variations and modifications can be affected within the spirit and scope of the invention.

Examples

1) Comparative Synthesis of Triiodosilane with and without TEEDA Catalyst (Lithium Iodide Powder, 5 Mol % N,N,N',N'-Tetraethylethylenediamine, Dichloromethane)

The following manipulations were performed in an inert atmosphere glovebox. Two 20 mL oven dried glass vials were equipped with PTFE coated magnetic stir fleas and charged with 4.93 g (36.9 mmol, 5 eq) lithium iodide powder (Merck, 99.9% trace metals, 99.1% Iodide by $AgNO_3$ titration), followed by 10 mL anhydrous dichloromethane resulting in an off-white slurry. To this slurry was added 1.00 g (7.38 mmol) trichlorosilane resulting in a slurry of off-white solid suspended in a pinkish purple solution. To one of the vials was added 0.127 g N,N,N',N'-Tetraethylethylenediamine (TEEDA) (3.69 mmol, 0.10 eq), and the reaction mixture immediately lost the pinkish-purple tinge and slowly turned pale yellow. Both vials were securely capped and stirred at ambient temperature while being periodically assayed by $^1$H NMR to monitor the progress of the reaction. The following table shows the percent conversion over time for the reaction with TEEDA and without TEEDA. Both the reaction with and without TEEDA showed 10-15% of a decomposition product suspected to be a halogenated siloxane and varying amounts of species suspected to be mixed chloroiodosilanes. After 3 days, the reaction with the TEEDA catalyst was no longer monitored due to the disappearance of all the starting trichlorosilane and all but 2% of the putative chloroiodosilanes.

| Time (days) | % Conversion (With TEEDA) | % $HSiI_3$ (With TEEDA) | % Conversion (Without TEEDA) | % $HSiI_3$ (Without TEEDA) |
|---|---|---|---|---|
| 3 | 100% | 81% | 77% | 13% |
| 12 | NA | NA | 85% | 45% |
| 35 | NA | NA | 100% | 81% |

2) Synthesis of Triiodosilane (Lithium Iodide Powder, 5 Mol % N,N,N',N'-Tetraethylethylenediamine (TEEDA), Dichloromethane)

The following manipulations were performed in an inert atmosphere glovebox. An oven dried 250 mL, 1-neck round bottom flask with a gas/vacuum inlet sidearm was equipped with a PTFE coated stir egg and charged with 44.4 g (332 mmol, 4.5 eq) lithium iodide powder (Merck 99.9% trace metals basis, 99.1% Iodide by $AgNO_3$ titration), followed by 50 mL anhydrous dichloromethane resulting in an off-white slurry. To this slurry was added 10.00 g trichlorosilane (73.8 mmol, 1 eq) resulting in a slurry of off-white solid suspended in a pinkish purple solution. The reaction mixture was then treated with 0.635 g N,N,N',N'-Tetraethylethylenediamine (TEEDA) (3.69 mmol, 0.05 eq), immediately lost the pinkish-purple tinge and slowly turned pale yellow. The flask was sealed with a glass stopper and stirred for 78 hours at ambient temperature. The reaction mixture was assayed by $^1$H NMR which indicated that all of the trichlorosilane had been consumed with the triiodosilane accounting for about 90% of the formed products. The reaction mixture was then allowed to stir for an additional 66 h and was assayed again by $^1$H NMR which showed that the product distribution had not changed. The reaction mixture was then vacuum filtered through a 1 cm celite bed in fritted funnel and the residual salts were washed with 80 mL of anhydrous pentane. The combined filtrates were transferred to an oven dried 250 mL, 1-neck round bottom flask with a gas/vacuum inlet sidearm and a PTFE stir egg. The filtrates were stripped of volatiles under reduced pressure (down to 15 torr) resulting in a yellow-green oil as the crude product. The crude product was vacuum distilled at 15 Torr using a short path distillation head and a stainless steel bead bath on a hotplate to heat the boiling pot. A forecut from 60° C. to 90° C. was discarded and the main fraction boiling at 103° C. was collected. The mass of the clear oil in the main fraction (98.4% by $^1$H NMR) was 18.69 g *(60.5% yield). $^1$H NMR ($C_6D_6$): δ=3.91 (s, J=327.5 Hz). $^{29}$Si{$^1$H} NMR ($C_6D_6$): δ=−170.31.

3) Synthesis of Triiodosilane (Lithium Iodide Beads, 5 Mol % N,N,N',N'-Tetraethylethylenediamine (TEEDA), Dichloromethane)*

The following manipulations were performed in an inert atmosphere glovebox. An oven dried 1 L, 1-neck round bottom flask with a gas/vacuum inlet sidearm was equipped with a PTFE coated stir egg and charged with 222 g (1.66 mol, 4.5 eq) lithium iodide −10 mesh beads (Alfa Aesar, 99% trace metals basis), followed by 113 mL (150 g) anhydrous dichloromethane resulting in an off-white slurry. To this slurry was added 50.00 g trichlorosilane (369 mmol, 1 eq) resulting in a slurry of white beads suspended in a slightly pinkish solution. The reaction mixture was then treated with 3.17 g N,N,N',N'-Tetraethylethylenediamine (TEEDA) (18.4 mmol, 0.05 eq), immediately lost the pinkish tinge and slowly turned pale yellow. The flask was sealed with a glass stopper and stirred at ambient temperature. The reaction mixture was periodically assayed by $^1$H NMR and the percent conversion (based on trichlorosilane starting material) and % triiodosilane formed were monitored as shown in the table below. The reaction mixture was filtered through a 1 cm celite bed in fritted funnel and the residual salts were washed with 300 mL of anhydrous pentane. The combined filtrates were transferred to an oven dried 500 mL, 1-neck round bottom flask with a gas/vacuum inlet sidearm and a PTFE stir egg. The filtrates were stripped of volatiles under reduced pressure (down to 15 Torr) resulting in a yellow-green oil with a large amount of residual solids as the crude product. The crude product was vacuum distilled at 15 torr using a short path distillation head and a stainless steel bead bath on a hotplate to heat the boiling pot. A forecut from 60° C. to 95° C. was discarded and the main fraction boiling at 99-100° C. was collected. The mass of the clear oil in the main fraction (96.2% by $^1$H NMR) was 60.78 g *(38.6% yield). $^1$H NMR ($C_6D_6$): δ=3.91 (s, J=327.5 Hz). $^{29}$Si{$^1$H} NMR ($C_6D_6$): δ=−170.31.

| Time (days) | % Conversion | % HSiI$_3$ |
| --- | --- | --- |
| 1 | 86% | 3% |
| 7 | 86% | 25% |
| 17 | 90 | 52 |
| 36 | 97 | 72 |

4) Synthesis of Triiodosilane (Lithium Iodide Powder, 5 Mol % N,N,N',N'',N''-Pentamethyldiethylenetriamine (PMDETA), Dichloromethane)

The following manipulations were performed in an inert atmosphere glovebox. An oven dried 250 mL, 1-neck round bottom flask with a gas/vacuum inlet sidearm was equipped with a PTFE coated stir egg and charged with 44.4 g (332 mmol, 4.5 eq) lithium iodide powder (Merck, 99.9% trace metals basis, 99.1% Iodide by AgNO$_3$ titration), followed by 50 mL anhydrous dichloromethane resulting in an off-white slurry. To this slurry was added 10.00 g trichlorosilane (73.8 mmol, 1 eq) resulting in a slurry of off-white solid suspended in a pinkish purple solution. The reaction mixture was then treated with 0.639 g N,N,N',N'',N''-Pentamethyldiethylenetriamine (PMDETA), (3.69 mmol, 0.05 eq), immediately lost the pinkish-purple tinge and slowly turned pale yellow. The flask was sealed with a glass stopper and stirred at ambient temperature for a total of 74 hours. The reaction mixture was periodically assayed by $^1$H NMR and the percent conversion (based on trichlorosilane starting material) and % triiodosilane formed were monitored. The reaction mixture was then vacuum filtered through a 1 cm celite bed in fritted funnel and the residual salts were washed with 100 mL of anhydrous pentane. The combined filtrates were transferred to an oven dried 250 mL, 1-neck round bottom flask with a gas/vacuum inlet sidearm and a PTFE stir egg. The filtrates were stripped of volatiles under reduced pressure (down to 15 torr) resulting in a yellow-green oil as the crude product. The crude product was vacuum distilled at 14 Torr using a short path distillation head and a stainless steel bead bath on a hotplate to heat the boiling pot. A forecut from 60° C. to 95° C. was collected, massed (1.29 g), and assayed by $^1$H NMR which indicated the presence of triiodosilane, a mixed chlor-iodosilane species, and several smaller impurity resonances. The triiodosilane accounted for 40-45% of the material present with the balance being impurities. The main fraction boiling at 95-96° C. was collected using a bath temp of 140-150° C. The mass of the clear, colorless oil in the main fraction (98.6% by $^1$H NMR) was 23.28 g (75.8% yield). $^1$H NMR ($C_6D_6$): δ=3.91 (s, J=327.5 Hz). $^{29}$Si{$^1$H} NMR ($C_6D_6$): δ=−170.31.

| Time (hours) | % Conversion | % HSiI$_3$ |
| --- | --- | --- |
| 4 | 86 | 52 |
| 68 | 96 | 89 |
| 74 | 96 | 90 |

5) Synthesis of Triiodosilane (Lithium Iodide Powder, 5 Mol % N,N,N',N'-Tetraethylethylenediamine (TEEDA), Hexanes)

The following manipulations were performed in an inert atmosphere glovebox. An oven dried 250 mL, 1-neck round bottom flask with a gas/vacuum inlet sidearm was equipped with a PTFE coated stir egg and charged with 44.4 g (332 mmol, 4.5 eq) lithium iodide powder (Merck, 99.9% trace metals basis, 99.1% Iodide by AgNO$_3$ titration), followed by 50 mL anhydrous hexanes resulting in an off-white slurry. To this slurry was added 10.00 g trichlorosilane (73.8 mmol, 1 eq) resulting in a slurry of off-white solid suspended in a pinkish purple solution. The reaction mixture was then treated with 0.635 g N,N,N',N'-Tetraethylethylenediamine (TEEDA) (3.69 mmol, 0.05 eq), immediately lost the pinkish-purple tinge and slowly turned pale yellow. The flask was sealed with a glass stopper and stirred for a total of ? hours at ambient temperature. The reaction mixture was periodically assayed by $^1$H NMR and the percent conversion (based on trichlorosilane starting material) and % triiodosilane formed were monitored. The reaction mixture was then vacuum filtered through a 1 cm celite bed in fritted funnel and the residual salts were washed with 100 mL of anhydrous hexanes. The combined filtrates were transferred to an oven dried 250 mL, 1-neck round bottom flask with a gas/vacuum inlet sidearm and a PTFE stir egg. The filtrates were stripped of volatiles under reduced pressure (down to 15 torr) resulting in a yellow-green oil as the crude product. The crude product was vacuum distilled at 14-15 Torr using a short path distillation head and a stainless steel bead bath on a hotplate to heat the boiling pot. A forecut from 60° C. to 88° C. was discarded and the main fraction boiling at 99-100° C. was collected. The mass of the clear oil in the main fraction (96.8% by $^1$H NMR) was 18.32 g (57.4% yield). $^1$H NMR ($C_6D_6$): δ=3.91 (s, J=327.5 Hz). $^{29}$Si{$^1$H} NMR ($C_6D_6$): δ=−170.31.

| Reaction Time (hours) | Percent Conversion | Percent Triiodosilane Formed |
| --- | --- | --- |
| 29 | 82 | 46 |
| 52 | 92 | 63 |
| 125 | 98 | 79 |
| 192 | 99 | 84 |

6) Synthesis of Triiodosilane (Lithium Iodide Powder, 5 Mol % N,N,N',N'-Tetramethylethylenediamine (TMEDA), Dichloromethane)

The following manipulations were performed in an inert atmosphere glovebox. An oven dried 250 mL, 1-neck round bottom flask with a gas/vacuum inlet sidearm was equipped with a PTFE coated stir egg and charged with 45.2 g (338 mmol, 4.5 eq) lithium iodide powder (Merck, 99.9% trace metals basis, 99.1% Iodide by AgNO$_3$ titration), followed by 50 mL anhydrous dichloromethane resulting in an off-white slurry. To this slurry was added 10.2 g trichlorosilane (75.3 mmol, 1 eq) resulting in a slurry of off-white solid suspended in a pinkish purple solution. The reaction mixture was then treated with 0.436 g N,N,N',N'-Tetramethylethylenediamine (TMEDA) (3.76 mmol, 0.05 eq), immediately lost the pinkish-purple tinge and slowly turned pale yellow. The flask was sealed with a glass stopper and stirred for a total of 332 hours at ambient temperature. The reaction mixture was periodically assayed by H NMR and the percent conversion (based on trichlorosilane starting material) and % triiodosilane formed were monitored. The reaction mixture was then vacuum filtered through a 1 cm celite bed in fritted funnel and the residual salts were washed with 100 mL of anhydrous pentanes. The combined filtrates were transferred to an oven dried 250 mL, 1-neck round bottom flask with a gas/vacuum inlet sidearm and a PTFE stir egg. The filtrates were stripped of volatiles under reduced pressure (down to 40 Torr) resulting in a slightly pink oil as the crude product. The crude product was vacuum distilled at 14-15 torr using a short path distillation head and a stainless steel bead bath on a hotplate to heat the boiling pot. A forecut from 50° C. to 98° C. was discarded and the main fraction boiling at 98-102° C. was collected. The mass of the clear oil in the main fraction (99.2% by $^1$H NMR) was 17.81 g (57.1% yield). $^1$H NMR ($C_6D_6$): δ=3.91 (s, J=327.5 Hz). 29Si{1H} NMR ($C_6D_6$): δ=−170.31.

| Reaction Time (hours) | Percent Conversion | Percent Triiodosilane Formed |
| --- | --- | --- |
| 22 | 65 | 27 |
| 48 | 88 | 60 |
| 113 | 99 | 89 |
| 332 | 100 | 86.3 |

7) Synthesis of Diiodomethylsilane (Lithium Iodide Powder, 5 Mol % N,N,N',N'',N''-Pentamethyldiethylenetriamine (PMDETA), Dichloromethane)

The following manipulations were performed in an inert atmosphere glovebox. A 20 mL oven dried glass vial was equipped with a PTFE coated magnetic stir flea and charged with 10.4 g (78.0 mmol, 3 eq) lithium iodide powder (Merck, 99.9% trace metals, 99.1% Iodide by $AgNO_3$ titration), followed by 15 mL anhydrous dichloromethane resulting in an off-white slurry. To this slurry was added 3.00 g (26.0 mmol, 1 eq) dichloromethylsilane resulting in a slurry of off-white solid suspended in a pinkish purple solution. The reaction mixture was then treated with 0.225 g N,N,N',N'',N''-Pentamethyldiethylenetriamine (PMDETA) (1.3 mmol, 0.05 eq), and the reaction mixture immediately lost the pinkish-purple tinge and slowly turned pale yellow before eventually bleaching to a near colorless mixture. The vial was securely capped and stirred at ambient temperature while being periodically assayed by $^1$H NMR to monitor the progress of the reaction. The following table shows the percent conversion over time for the reaction. After 144 hours of stirring, the reaction mixture showed no further changes in product distribution. The reaction mixture was filtered through a 1 cm bed of activated celite, washed with 40 mL of anhydrous pentane, and the filtrates stripped of volatiles under a 40 torr vacuum. The peach colored oil that resulted was assayed by $^1$H NMR which indicated 95% purity with chloroiodomethylsilane being the dominant impurity. The mass of the product was 4.51 g (55.2% yield). $^1$H NMR ($C_6D_6$): δ=1.01 (d, J=3.01 Hz), 4.65 (q, J=3.01 Hz. 29Si{1H} NMR ($C_6D_6$): δ=−66.51

| Reaction Time (hours) | Percent Conversion | Percent Diiodomethylsilane Formed |
| --- | --- | --- |
| 4 | 63 | 27 |
| 78 | 89 | 89 |
| 144 | 92 | 92 |

8) Synthesis of Triiodosilane (Lithium Iodide Powder, 5 Mol % N,N,N',N'',N''-Pentamethyldiethylenetriamine (PMDETA), Toluene)

The following manipulations were performed in an inert atmosphere glovebox. An oven dried 250 mL, 1-neck round bottom flask with a gas/vacuum inlet sidearm was equipped with a PTFE coated stir egg and charged with 44.4 g (332 mmol, 4.5 eq) lithium iodide powder (Merck, 99.9% trace metals basis, 99.1% Iodide by $AgNO_3$ titration), followed by 50 mL anhydrous toluene resulting in an off-white slurry. To this slurry was added 10.00 g trichlorosilane (73.8 mmol, 1 eq) resulting in a slurry of off-white solid suspended in a pinkish purple solution. The reaction mixture was then treated with 0.639 g N,N,N',N'',N''-Pentamethyldiethylenetriamine (PMDETA), (3.69 mmol, 0.05 eq), immediately lost the pinkish-purple tinge and slowly turned pale yellow. The flask was sealed with a glass stopper and stirred at ambient temperature for a total of 288 hours. The reaction mixture was periodically assayed by $^1$H NMR and the percent conversion (based on trichlorosilane starting material) and % triiodosilane formed were monitored. The reaction was judged to be complete after 96 hours stirring. The reaction mixture was then vacuum filtered through a 1 cm celite bed in fritted funnel and the residual salts were washed with 100 mL of anhydrous pentane. The combined filtrates were transferred to an oven dried 250 mL, 1-neck round bottom flask with a gas/vacuum inlet sidearm and a PTFE stir egg. The filtrates were stripped of volatiles under reduced pressure (down to 15 torr) resulting in a yellow-green oil as the crude product. The crude product was vacuum distilled at 15 Torr using a short path distillation head and a stainless steel bead bath on a hotplate to heat the boiling pot. The main fraction boiling at 98-102° C. was collected using a bath temp of 140-150° C. The mass of the clear, colorless oil in the main fraction (98.1% by $^1$H NMR) was 17.33 g (56.2% yield). $^1$H NMR ($C_6D_6$): δ=3.91 (s, J=327.5 Hz). 29Si{1H} NMR ($C_6D_6$): δ=−170.31.

| Time (hours) | % Conversion | % $HSiI_3$ |
| --- | --- | --- |
| 3 | 62.2 | 28.5 |
| 48 | 94.5 | 65.9 |
| 72 | 98.7 | 82.0 |
| 288 | 100 | 94.7 |

1) Synthesis of Triiodosilane (Lithium Iodide Powder, 5 Mol % Triethylamine (TEA), DCM)

The following manipulations were performed in an inert atmosphere glovebox. An oven dried 250 mL, 1-neck round bottom flask with a gas/vacuum inlet sidearm was equipped with a PTFE coated stir egg and charged with 44.4 g (332 mmol, 4.5 eq) lithium iodide powder (Merck, 99.9% trace metals basis, 99.1% Iodide by $AgNO_3$ titration), followed by 50 mL anhydrous dichloromethane resulting in an off-white slurry. To this slurry was added 10.00 g trichlorosilane (73.8 mmol, 1 eq) resulting in a slurry of off-white solid suspended in a pinkish purple solution. The reaction mixture was then treated with 0.373 g triethylamine (TEA), (3.69 mmol, 0.05 eq), immediately lost the pinkish-purple tinge and slowly turned pale yellow. The flask was sealed with a glass stopper and stirred at ambient temperature for a total of 24 hours. The reaction mixture was periodically assayed by $^1$H NMR and the percent conversion (based on trichlorosilane starting material) and % triiodosilane formed were monitored. The reaction mixture was then vacuum filtered through a 1 cm celite bed in fritted funnel and the residual salts were washed with 100 mL of anhydrous pentane. The combined filtrates were transferred to an oven dried 250 mL, 1-neck round bottom flask with a gas/vacuum inlet sidearm and a PTFE stir egg. The filtrates were stripped of volatiles under reduced pressure (down to 15 torr) resulting in a yellow-green oil as the crude product. The crude product was vacuum distilled at 14 Torr using a short path distillation head and a stainless steel bead bath on a hotplate to heat the boiling pot. The main fraction boiling at 98-101° C. was collected using a bath temp of 140-150° C. The mass of the clear, colorless oil in the main fraction (95% by $^1$H NMR) was 19.02 g (59.6% yield). $^1$H NMR ($C_6D_6$): δ=3.91 (s, J=327.5 Hz). 29Si{1H} NMR ($C_6D_6$): δ=−170.31.

| Time (hours) | % Conversion | % HSiI$_3$ |
|---|---|---|
| 2 | 96 | 94 |
| 24 | 96 | 93 |

| Ex | Halosilane Substrate/ Scale | Catalyst | Solvent | LiI Form | Reaction Time (Until no further increase in HSiI$_3$) | % Yield (After distillation, adjusted for purity) |
|---|---|---|---|---|---|---|
| 2 | HSiCl$_3$/10 g | TEEDA | DCM | Powder | 78 h | 60.5 |
| 3 | HSiCl$_3$/50 g | TEEDA | DCM | Bead | 35 d | 38.6 |
| 4 | HSiCl$_3$/10 g | PMDETA | DCM | Powder | 74 h | 75.8 |
| 5 | HSiCl$_3$/10 g | TEEDA | Hexanes | Powder | 192 h | 57.4 |
| 6 | HSiCl$_3$/10 g | TMEDA | DCM | Powder | 113 | 57.1 |
| 7 | MeSiCl$_2$H/ 3 g | PMDETA | DCM | Powder | 144 | 55.2 |
| 8 | HSiCl$_3$/10 g | PMDETA | Toluene | Powder | 96 (Est) | 56.2 |
| 9 | HSiCl$_3$/10 g | TEA | DCM | Powder | 2 | 59.6 |

We claim:

1. A process for preparing compounds of the formula $(R^1)_y Si(I)_z$, wherein each $R^1$ is independently chosen from hydrogen, $C_1$-$C_9$ alkyl, vinyl, or a $C_2$-$C_4$ alkynyl group, y is 0, 1, 2, or 3, and z is 1, 2, 3, or 4, and wherein y+z is equal to 4, which comprises contacting a compound of the formula $(R^1)_y Si(Cl)_z$ with lithium iodide in the presence of a tertiary amine, tetraalkylammonium halide, or tetraalkylphosphonium halide wherein the lithium iodide is in the form of a powder having an average particle size of less than about 2 mm.

2. The process of claim 1, wherein the particle size of the lithium iodide powder is less than about 1 mm.

3. The process of claim 1, wherein the particle size of the lithium iodide powder is less than about 0.5 mm.

4. The process of claim 1, wherein the particle size of the lithium iodide powder is less than about 0.1 mm.

5. The process of claim 1, wherein the compound of the formula $(R^1)_y Si(I)_z$ is triiodosilane.

6. The process of claim 1, wherein the compound of the formula $(R^1)_y Si(I)_z$ is chosen from CH$_3$Si(I)$_3$, CH$_3$CH$_2$Si(I)$_3$, CH$_3$CH$_2$CH$_2$Si(I)$_3$, CH$_3$CH$_2$CH$_2$CH$_2$Si(I)$_3$, (CH$_3$)$_2$CHSi(I)$_3$, CH$_3$CH$_2$(CH$_3$)CHSi(I)$_3$, (CH$_3$)$_3$CSi(I)$_3$, CH$_3$CH$_2$CH$_2$CH$_2$Si(I)$_3$, (CH$_3$)$_3$CCH$_2$Si(I)$_3$, CH$_2$=CHSi(I)$_3$, CH≡CSi(I)$_3$, CH≡CCH$_2$Si(I)$_3$, CH$_3$C≡CSi(I)$_3$, CH≡CCH$_2$CH$_2$Si(I)$_3$, CH$_3$CH≡CCH$_2$Si(I)$_3$, CH$_2$CH$_2$CH$_2$C≡CSi(I)$_3$, (CH$_3$)$_2$Si(I)$_2$, CH$_3$CH$_2$)$_2$Si(I)$_2$, (CH$_3$CH$_2$)$_2$Si(I)$_2$, (CH$_3$CH$_2$CH$_2$)$_2$Si(I)$_2$, ((CH$_3$)$_2$CH)$_2$Si(I)$_2$, (CH$_3$CH$_2$(CH$_3$)CH)$_2$Si(I)$_2$, ((CH$_3$)$_3$C)$_2$Si(I)$_2$, (CH$_3$CH$_2$CH$_2$CH$_2$)$_2$Si(I)$_2$, ((CH$_3$)$_3$CCH$_2$)$_2$Si(I)$_2$, (CH$_2$=CH)$_2$Si(I)$_2$, (CH≡C)$_2$Si(I)$_2$, (CH≡CCH$_2$)$_2$Si(I)$_2$, (CH$_3$C≡C)$_2$Si(I)$_2$, (CH≡CCH$_2$CH$_2$)$_2$Si(I)$_2$, (CH$_3$CH≡CCH$_2$)$_2$Si(I)$_2$, (CH$_2$CH$_2$CH$_2$C≡C)$_2$Si(I)$_2$, (CH$_3$)$_3$SiI, (CH$_3$CH$_2$)$_3$SiI, (CH$_3$CH$_2$CH$_2$)$_3$SiI, (CH$_3$CH$_2$CH$_2$CH$_2$)$_3$SiI, ((CH$_3$)$_2$CH)$_3$SiI, (CH$_3$CH$_2$(CH$_3$)CH)$_3$SiI, ((CH$_3$)$_3$C)$_3$SiI, (CH$_3$CH$_2$CH$_2$CH$_2$)$_3$SiI, ((CH$_3$)$_3$CCH$_2$)$_3$SiI, (CH$_2$=CH)$_3$SiI, (CH≡C)$_3$SiI, (CH≡CCH$_2$)$_3$SiI, (CH$_3$C≡C)$_3$Si, (CH≡CCH$_2$CH$_2$)$_3$SiI, (CH$_3$CH≡CCH$_2$)$_3$SiI, and (CH$_2$CH$_2$CH$_2$C≡C)$_3$SiI.

7. The process of claim 1, wherein the tertiary amine is a mono-amine.

8. The process of claim 7, wherein the tertiary amine is triethylamine.

9. The process of claim 1, wherein the tertiary amine has the formula:

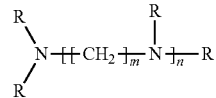

wherein each R is independently hydrogen or a $C_1$-$C_9$ alkyl group, m is an integer of from 1 to 4, and n is an integer of from 2 to 5.

10. The process of claim 9, wherein the tertiary amine has the formula

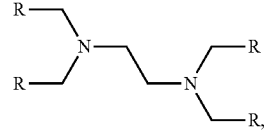

wherein each R is independently hydrogen or a $C_1$-$C_9$ alkyl group.

11. The process of claim 9, wherein the tertiary amine has the formula

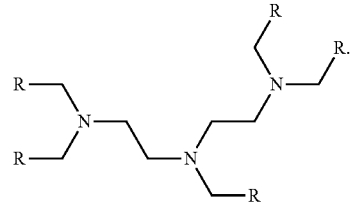

wherein each R is independently hydrogen or a $C_1$-$C_9$ alkyl group.

12. The process of claim 9, wherein each R is independently chosen from methyl and ethyl.

13. The process of claim 1, wherein the tertiary amine is N,N,N',N'-tetraethylene diamine.

14. The process of claim 1, wherein the tertiary amine is N,N,N',N'',N''-pentamethyldiethylenetriamine.

15. The process of claim 1, wherein the tetraalkylammonium chloride is tetrabutylammonium chloride.

16. The process of claim 1, wherein the tetraalkylphosphonium chloride is tetrabutylphosphonium chloride.

* * * * *